March 21, 1933. A. N. WENTINK 1,902,742
INSULATION STRIPPING DEVICE
Filed Sept. 28, 1931 2 Sheets-Sheet 2
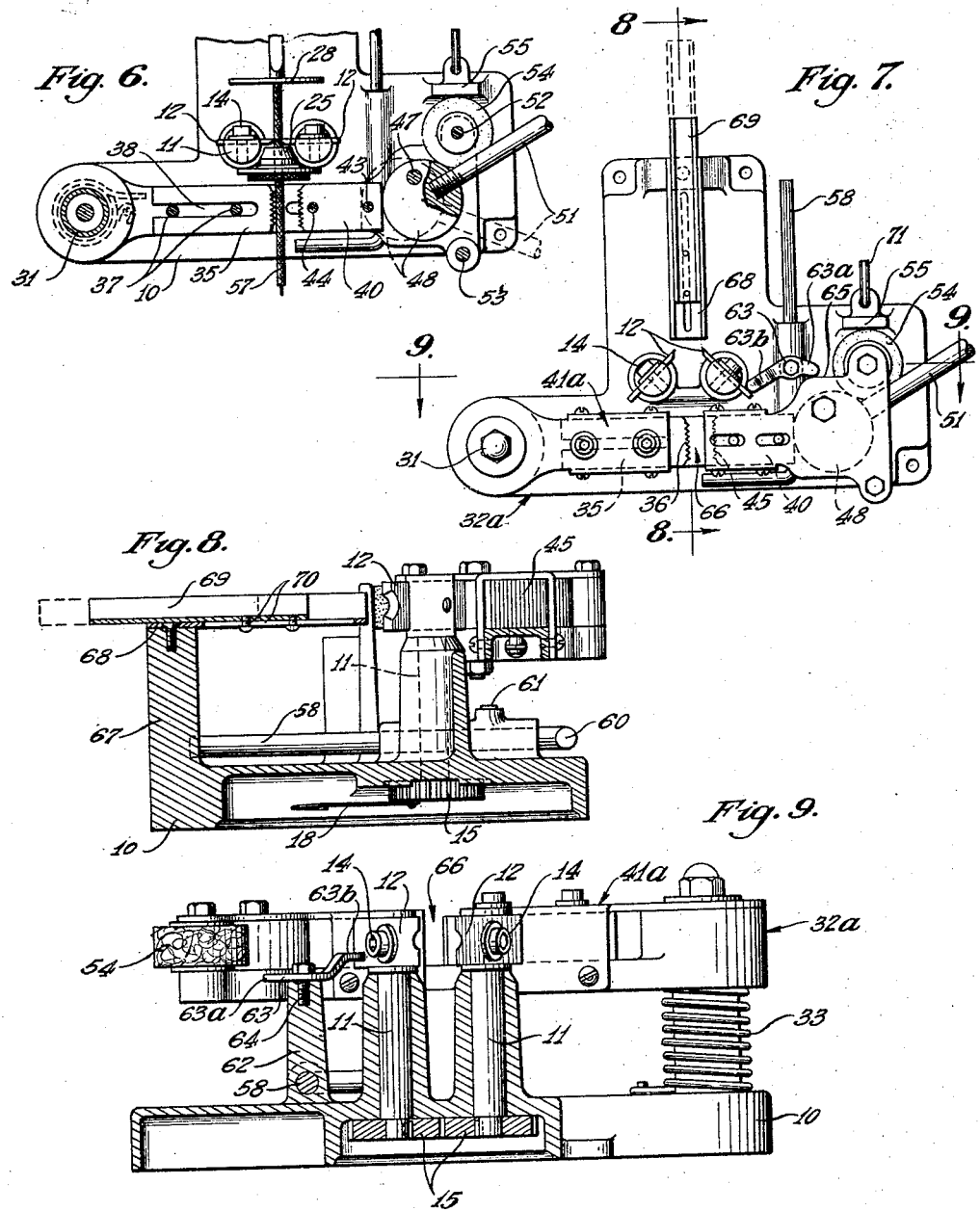
Alfred N. Wentink, INVENTOR
Victor J. Evans & Co.
HIS ATTORNEYS Patented Mar. 21, 1933

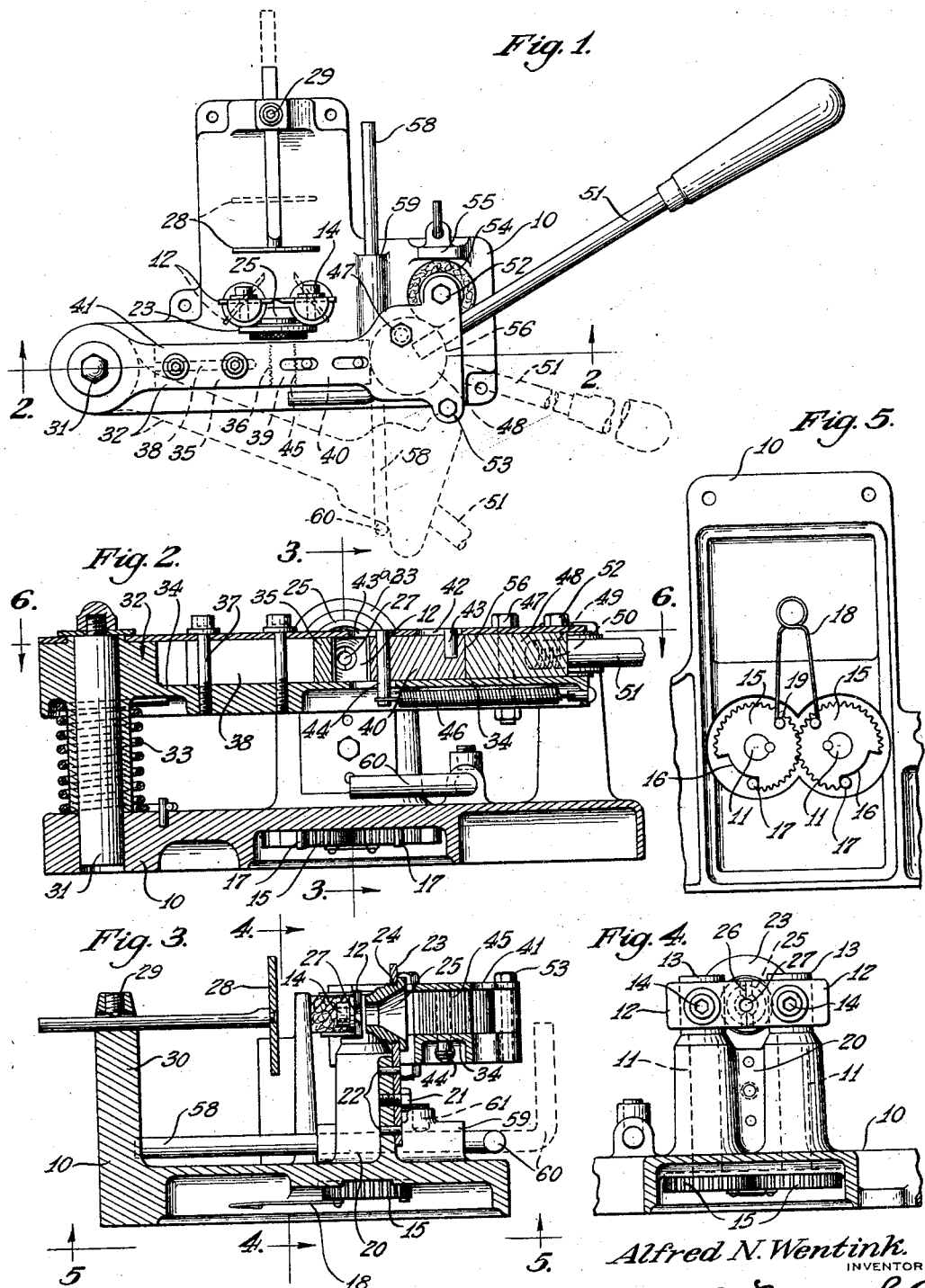

1,902,742

UNITED STATES PATENT OFFICE

ALFRED N. WENTINK, OF CHICAGO, ILLINOIS

INSULATION STRIPPING DEVICE

Application filed September 28, 1931. Serial No. 565,678.

This invention relates to certain novel improvements in insulation stripping devices, and has for its principal object the provision of an improved construction of this character which will be highly efficient in use and economical in manufacture.

This invention relates to devices for stripping insulation from electrical conductors so that an electrical connection may be made thereto and the invention represents certain improvements upon the device shown in my U. S. Patent 1,673,196, dated June 12, 1928.

The present invention has among its objects the provision of means to grip the insulated conductor and means by which to pull the same through the stripping knives, the latter being disclosed in the above mentioned patent, so as to strip the insulation from the end of the conductor.

Another object of the invention is to provide means to grip the insulated conductor and mechanism associated therewith by means of which to pull the insulated conductor between the stripping knives in such a manner that a predetermined length of the insulation may be stripped from the conductor between, or at a point distant from, the ends thereof whereby an electrical connection may be made to the conductor at said point distant from the ends of the conductor.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a top plan view of a preferred form of construction of the invention;

Fig. 2 is a sectional view on line 2—2 in Fig. 1;

Fig. 3 is a sectional view on line 3—3 in Fig. 2;

Fig. 4 is a sectional view on line 4—4 in Fig. 3;

Fig. 5 is a bottom plan view on line 5—5 in Fig. 3;

Fig. 6 is a sectional view, partly in top plan, on line 6—6 in Fig. 2;

Fig. 7 is a top plan view of a modification of the invention;

Fig. 8 is a sectional view on line 8—8 in Fig. 7; and

Fig. 9 is a sectional view on line 9—9 in Fig. 7.

Referring to the drawings, wherein the preferred embodiments of the invention are illustrated, and particularly now to Figs. 1 to 6 inclusive, 10 indicates a block forming a base adapted to be mounted on a suitable support, such as, for example, a workbench. Rotatably journaled in the base 10 is a pair of posts 11 which carry, at their outer ends, stripping knives 12 which are secured to the heads 13 of the posts by screws or bolts 14. Rigidly secured to the inner or lower ends of the posts are gears 15 which mesh with each other. The gears are provided with slots 16 which co-operate with pins 17 that project from the base to limit angular displacement of the posts about their respective axes of rotation. A spring 18 has its ends secured to the gears 15 by pins or screws 19 and is so constructed that it tends to rotate the gears 15 and posts 11, in unison or synchronism, and to maintain the knives in the full line position shown in Fig. 1. The posts 11 may be displaced, against the action of the spring, to move the knives into the dotted line position of Fig. 1.

Mounted on a post 20, which projects above the base 10, by a bolt 21 and pins 22, is a bracket 23 in which is provided a threaded opening 24 into which is screwed a guiding annulus 25, the pins 22 preventing turning of the bracket as the guide 25 is inserted and removed. In each of the meeting edges 26 of the knives an indent (Fig. 4) is formed to provide an aperture 27 and in use the insulated end portion of a conductor, such, for example, as 57, is extended through the guide 25 and between the knives 12, whereby the knives 12 will be spread apart, turning with and on the posts 11. The end of the conductor is then abutted against a gauge 28 which is adjustably mounted by a set screw 29, in a portion 30 that projects from the base; the gauge being previously adjusted so that the insulation will be stripped from a predetermined length of the conductor. The insulated conductor is then gripped and pulled back between the knives which then bite into the insulation to cut the same and strip a predetermined length of it from the conductor, the stripped portion being then pulled back through aperture 27. The means for gripping and pulling the conductor to effect the stripping operation constitute an improvement over my above identified patent and will now be described and hereinafter claimed in combination with the knives and the means already described for constraining the knives to rotate in unison.

A bearing post 31 is mounted on the base 10 and movably mounted on the post 31, so that one end pivots thereabout, is an arm generally indicted at 32, this arm being urged into full line position of Fig. 1 by a spring 33. Adjustably mounted on a shelf 34 of the arm 32 is a stationary block or gripping jaw 35 which has gripping teeth 36 at its inner end, this block being adjustable on the shelf portion 34 of arm 32 toward and from the aperture 27 and clamped in an adjusted position by bolts or screws 37 which project through a slot 38 in the block and into threaded holes in the shelf 34, so as to vary the width of the space 39 between the stationary jaw 35 and a block or gripping jaw 40 which is movable relative to the jaw 35. The jaw 40 is provided with teeth 45 adapted to co-operate with the teeth 36 to bite into and grip the insulated conductor in a manner hereinafter explained.

The bolts or screws 37 extend through apertures in a plate 41 that extends over the jaws 35 and 40 as a part of the arm 32, said jaw 40 being movably mounted on the shelf 34 in a manner now to be described. A slot 42 is provided in the plate 41 and slidable therein is a pin 43 carried by the jaw 40. A second slot 43a is provided in the plate 41 and movable therein is a pin 44 also carried by the jaw 40. Attached to the pin 44 is one end of a spring 46, the other end of which is attached to the shelf 34.

Rotatably and eccentrically mounted on the shelf 34 of arm 32, under the plate 41, and as at 47, is a cam 48 in which is provided a threaded socket 49 for the reception of the threaded end portion 50 of a handle 51, the movement of which is limited by stops or bolts 52 and 53 that extend through openings in the plate 41 and are threaded into threaded openings in the shelf 34. A bumper block 54 is mounted on the stop 52 and abuts a stop in the form of a boss 55 on the base 10 when the handle 51 and arm 32 are in full line position of Fig. 1.

The spring 46 tends to keep the slide block or gripping jaw 40 spaced from stationary gripping jaw 35, as in Fig. 1, and the spring 33 tends to keep the arm 32 in full line position of Fig. 1. The spring 46 therefore urges the gripping jaw 40 against the peripheral face 56 of the cam 48. When, therefore, an insulated wire is extended through the guide 25 and between the knives 12, the handle 51 is moved from full toward dotted line position of Fig. 1, thereby rotating the eccentric cam 48 which abuts the slidable gripping jaw 40 and moves the latter toward the stationary jaw 35 whereby the teeth 36 and 45 bite into the insulation of the wire whereupon, with further pull on handle 51, arm 32 and handle 51 move together in unison and the wire is moved therewith, the arm 32 pivoting on its mounting or bearing post 31, whereby the wire is retracted or pulled back through the guide 25 causing the knives to strip a predetermined length of insulation therefrom. Release of handle 51 will then enable the spring 33 to return the arm 32 to full line position of Fig. 1, whereupon the bumper 54 will abut the stop 55. The spring 46 meanwhile acts on slidable gripping jaw 40 to urge the latter to rotate the cam 48 counterclockwise (Fig. 1), thus separating the jaws 40 and 35 sufficiently to permit the wire thus stripped of a portion of its insulation to be drawn out of guide 25 and the stripped portion to be pulled through aperture 27.

To limit and gauge the movement of the arm 32 I provide an adjustable stop arm 58 which is slidable and rotatable in a boss 59 formed on the base 10, this stop 58 having an angled end 60 against which the arm 32 will abut (Fig. 3) when the portion 60 is upright. A set screw 61 is provided to secure the stop arm 58 in various positions and thus vary the movement permitted arm 32.

In the modification shown in Figs. 7 to 9 inclusive, those parts of the invention that are similar to parts hereinbefore described are given the reference numerals already employed, and other reference numerals are given to those parts that distinguish this modification from the form of the invention shown in Figs. 1 to 6.

On a post 62 that projects above the base 10 an arm 63 is pivotally mounted, as by a screw 64. This arm 63 is so arranged that one end portion 63a thereof (Fig. 7) is abutted by a surface 65 of the arm 32a, which is similar to the arm 32, except as hereinafter pointed out, when the arm 32a is in the nonoperating position of Fig. 7. At this time the other end portion 63b abuts one of the knives 12 and, since the knives 12 move in unison or synchronism, they are thus held apart, as in Fig. 7, ready for the insertion therebetween of an insulated wire such as 57. In this form of the invention the guide 25 and its supporting bracket 23 are eliminated and the cap plate 41a is split or made in two sections (Fig. 7) to provide a passage 66 through which the wire 57 may be inserted between the knives 12. As the arm 32a is rotated by handle 51 clockwise (Fig. 7) about its pivot 31, and the slidable gripping jaw 40 is moved by cam 48 toward jaw 35, the surface 65 is moved away from the portion 63a of the arm 63 thus freeing the arm 63, whereupon the spring 18 rotates the gears 15 and posts 11 to move the knives 12 into parallel relation while at the same time the teeth 36 and 45 grip the insulated wire and the arm 32a pulls the same to cut and strip or peel back a portion of the insulation therefrom.

On a portion 67 which projects above the base 10 the stationary part 68 of an extensible guide is mounted to direct the wire between the knives, said guide including a movable element 69 which is slidably joined to the part 68 by pin and slot connections 70. This guide is open at both ends and an insulated wire or the like may therefore be placed on the guide so as to extend between the knives 12 and through passage 66, whereupon a portion of the insulation disposed between, and at some distance from the ends of the conductor may be cut and stripped or peeled back by moving handle 51, arm 32a, and slidable jaw 40, in the manner hereinbefore described.

71 indicates a socket wrench for the socket headed bolts or screws 14 and like parts.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A device of the character described, comprising a base, rotatable elements on the base, stripping knives carried by the rotatable elements, means constraining said elements and knives to rotate in unison, an arm pivotally mounted on the base, a slidable jaw and a relatively stationary jaw carried by said arm adapted to grip an object and pull the same between the knives, a rotatable cam eccentrically mounted on said arm to move said slidable jaw toward said stationary jaw, a handle attached to said cam for moving the same, and stops on said arm limiting movement of said handle relative to said arm.

2. An insulation stripping device comprising a base, rotatable elements on the base, stripping knives carried by said elements, means constraining the knives and said elements to rotate in unison, an arm pivotally mounted on said base, a pair of gripping jaws on said arm one slidable relative to the other, and means movably mounted on said arm having limited movement relative thereto to first move said slidable jaw toward said other jaw and to then move said arm.

3. A device for stripping insulation from wires and the like, comprising a base, rotatable elements on the base, stripping knives carried by said elements, means constraining the knives and said elements to rotate in unison, a member pivotally mounted on the base, gripping means including a slidable gripping jaw carried by said member, a rotatable cam carried by said pivotal member to operate said jaw, and a handle attached to said cam having limited movement relative to said pivotal member.

4. A device of the character described comprising a base, rotatable elements on the base, stripping knives carried by the elements, an arm pivotally mounted on the base, a pair of gripping jaws carried by said arm one slidable relative to the other, a cam eccentrically mounted on said arm for operating the slidable gripping jaw, a handle attached to the cam, and stops on said arm limiting movement of said handle and cam relative to said arm.

5. A device of the character described, comprising a base, rotatable elements on the base, stripping knives carried by said elements, an arm pivotally mounted on the base, gripping means carried by the arm including a slidable gripping jaw, a rotative cam eccentrically mounted on said arm for operating said slidable jaw, and a handle attached to said cam having limited movement relative to said arm.

6. A device of the character described comprising a base, rotatable elements journaled in the base, stripping knives carried by said elements, means constraining the knives and said elements to rotate in unison, an arm pivotally mounted on the base, a slidable gripping jaw carried by the arm, a gripping jaw carried by the arm relatively stationary with respect to the slidable jaw, a rotative cam carried by the arm to move the movable jaw toward the stationary jaw, and a handle attached to the cam having limited movement relative to said arm.

7. A device for stripping insulation from wires and the like comprising a base, rotatable elements on the base, stripping knives carried by said elements, an arm pivotally mounted on the base, a relatively stationary gripping jaw carried by the arm, a slidable gripping jaw carried by the arm, a handle on the arm having limited movement relative thereto, and a cam attached to the handle to move the slidable jaw toward the relatively stationary jaw.

8. A device for stripping insulation from wires and the like comprising a base, rotatable elements on the base, stripping knives carried by said elements, means constraining the knives to rotate in unison, an arm pivotally mounted on the base including a guideway, a pair of gripping jaws carried by the arm in the guideway adapted to have the wire inserted therebetween and one of said jaws being slidable in the guideway relative to the other of said jaws, a cam eccentrically mounted on said arm to move the slidable jaw toward said other jaw, and a handle attached to the cam having limited movement relative to said arm.

9. A device for stripping insulation from wires and the like comprising a base, rotatable elements on the base, stripping knives carried by said elements means constraining the knives to rotate in unison, an arm pivotally mounted on the base, a relatively stationary gripping member carried by the arm, a slidable gripping member carried by the arm, a pivotal cam eccentrically mounted on the arm to move the slidable gripping member toward the stationary gripping member, and stops on said arm limiting movement of said handle and cam relative to said arm.

10. A device for stripping insulation from wires and the like comprising a base, rotatable elements on the base, stripping knives carried by said elements, an arm pivotally mounted on the base, a relatively stationary gripping member carried by the arm, a slidable gripping member carried by the arm, a pivotal handle carried by the arm, having limited movement relative thereto and a cam carried by the arm attached to the handle to move the slidable gripping member toward the stationary gripping member.

11. A device for stripping insulation from wires and the like comprising a base, rotatable elements on the base, stripping knives carried by said elements, an arm pivotally mounted on the base, a relatively stationary gripping member carried by the arm, a slidable gripping member carried by the arm, a rotative cam eccentrically mounted on the arm to move the slidable gripping member toward the stationary gripping member, a handle attached to the cam, and means carried by the arm to limit movement of said cam and handle relative to said arm.

12. An insulation stripping device, comprising a base, stripping knives, an arm pivotally mounted on the base, a relatively stationary gripping member carried by the arm, a slidable gripping member carried by the arm, a cam movably mounted on the arm to move the slidable gripping member toward the stationary gripping member, and a handle attached to the cam having limited movement relative to said arm.

13. A device for stripping insulation from wires and the like comprising a base, rotatable elements on the base, knives carried by the elements adapted to have an insulated wire inserted therebetween, means constraining the knives to rotate in unison, an arm pivotally mounted on the base, a relatively stationary gripping member carried by the arm, a slidable gripping member carried by the arm, a handle to move the arm, a cam carried by the arm and operated by the handle to move the slidable gripping member toward the stationary gripping member whereby to grip a portion of the wire disposed between said members and pull the wire between the knives, and a pivotal member engaged by the arm when in non-operating position and having a portion bearing against one of the knives to keep the knives spread apart for the insertion therebetween of the wire.

In testimony whereof I affix my signature.

ALFRED N. WENTINK.